Dec. 5, 1944.                B. F. OWEN                    2,364,470
           MACHINE FOR GATHERING, TRANSPORTING AND STACKING MATERIALS
                        Filed Aug. 20, 1943           3 Sheets-Sheet 2
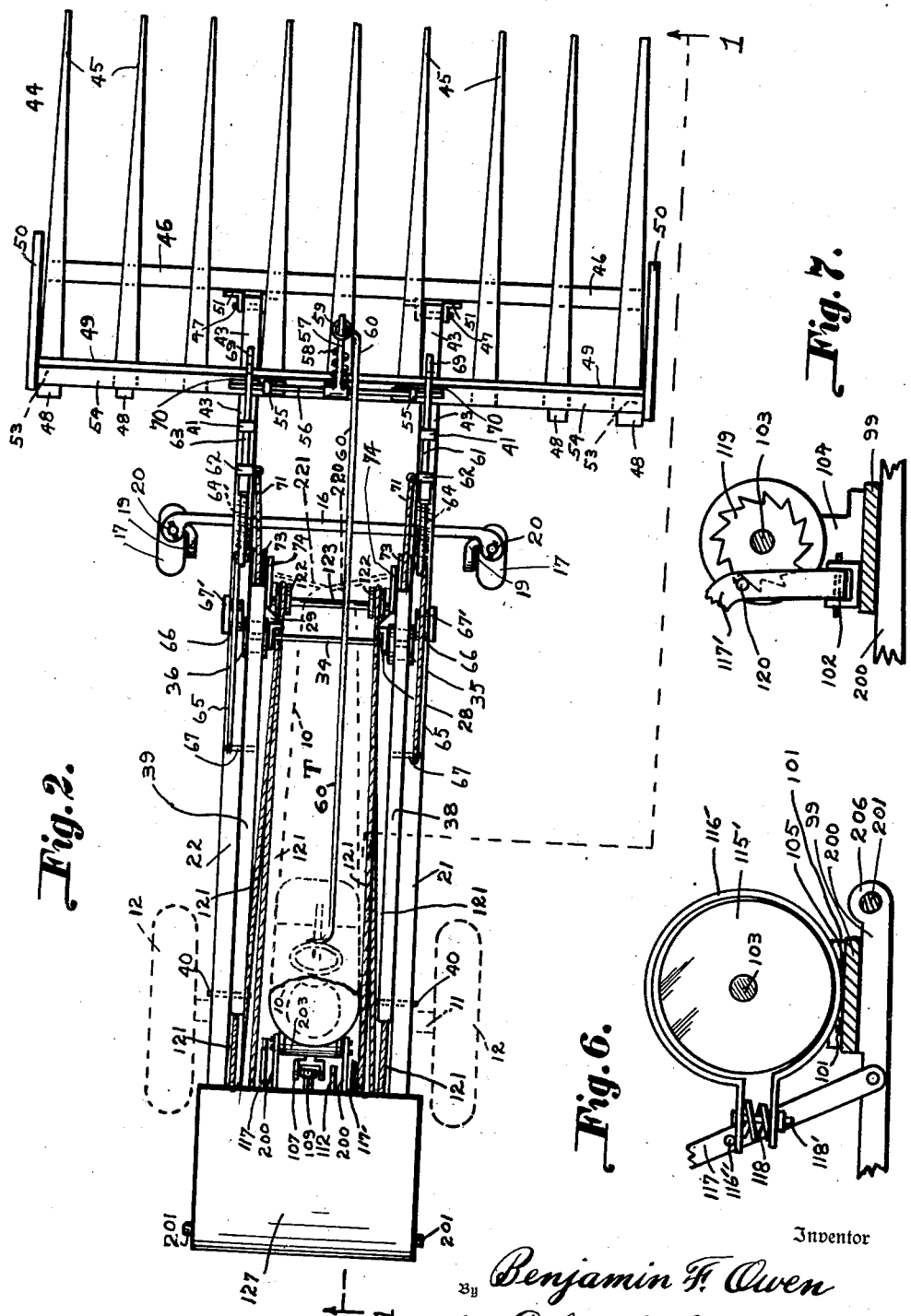
Inventor
By Benjamin F. Owen
   Arthur H. Sturges.
                Attorney Dec. 5, 1944. B. F. OWEN 2,364,470
MACHINE FOR GATHERING, TRANSPORTING AND STACKING MATERIALS
Filed Aug. 20, 1943 3 Sheets-Sheet 3
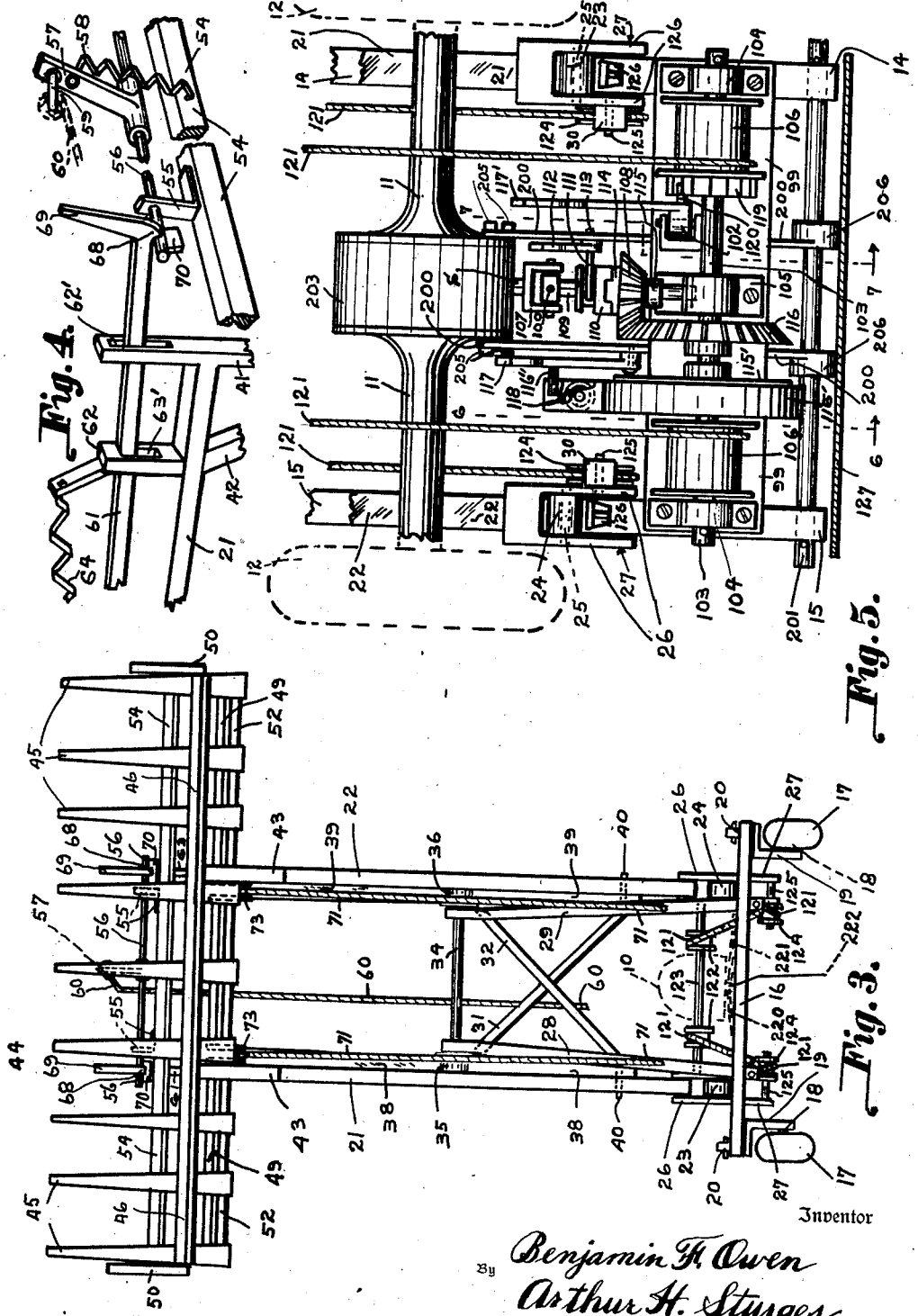
Inventor
Benjamin F. Owen
By Arthur H. Sturges
Attorney Patented Dec. 5, 1944

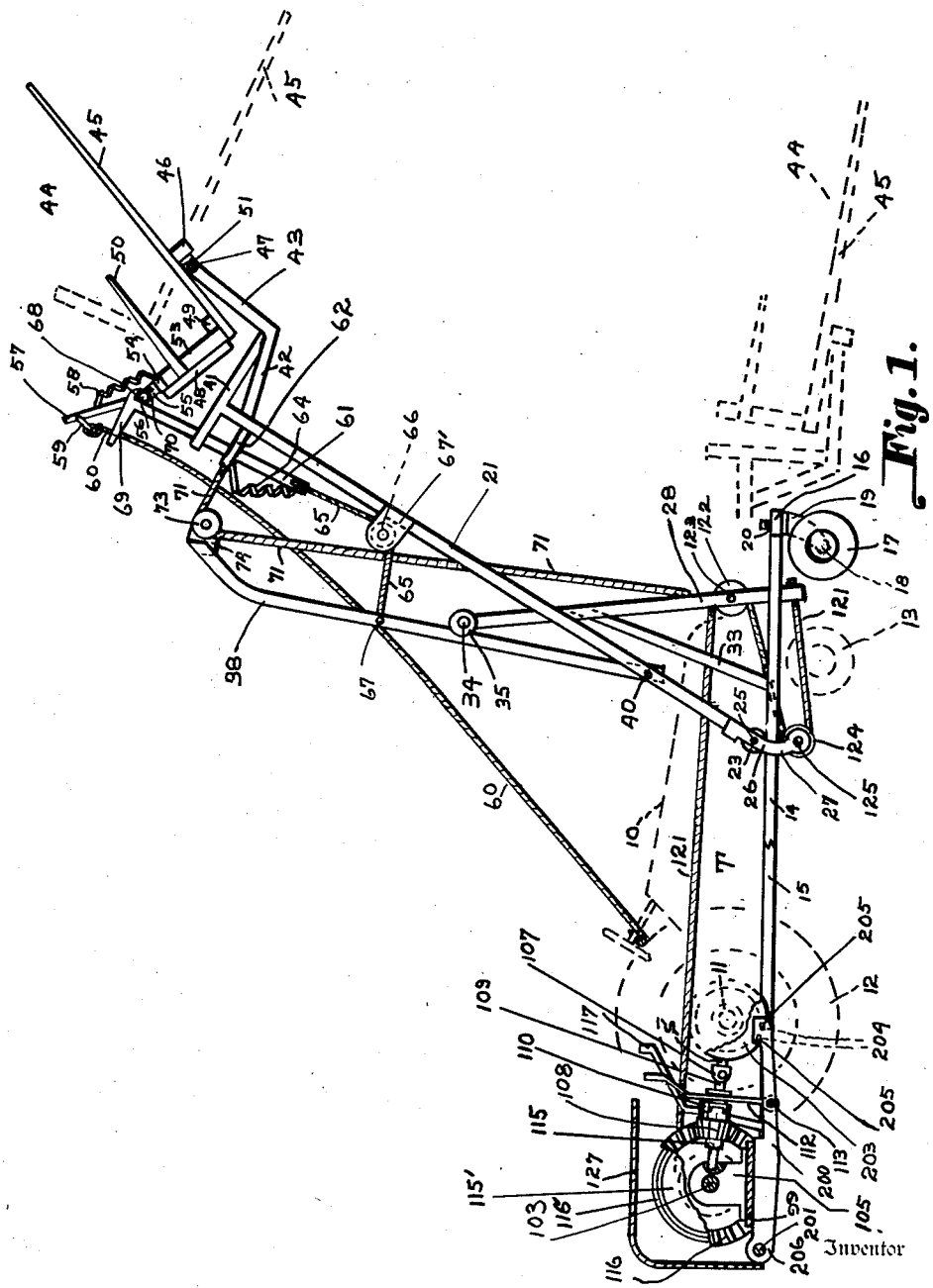

2,364,470

UNITED STATES PATENT OFFICE 2,364,470

MACHINE FOR GATHERING, TRANSPORTING, AND STACKING MATERIALS

Benjamin F. Owen, Omaha, Nebr.

Application August 20, 1943, Serial No. 499,353

4 Claims. (Cl. 214—148)

This invention relates to the art of gathering, elevating, transporting while elevated, dumping and stacking materials, and more particularly to gathering and stacking mown hay and the like.

It is an object of the invention to provide a haysweep stacker so constructed that it is readily combined with a suitable type of tractor and assembled therewith in a manner for utilizing the engine of the tractor for operating the new mechanism.

Another object of the invention is to so provide a sweep-head of the new mechanism that it permits a quick attachment and removal thereof from the other parts of the combination, so that a manure fork, earth scraper, logging hooks or other hoisting and material handling equipment may be selectively used in lieu of the specific haysweep head shown and described herein.

A further object of the invention is to provide means for the above stated purposes which is so constructed and arranged that the forward portion of the mechanism is permitted to have movements in a vertical direction independently of the tractor to which it is attached, whereby said forward portion is supported upon the ground in a manner to compensate for unevenness of ground surfaces during forward travel of the machine while sweeping and gathering hay from a windrow of mown hay disposed on the surface of a hayfield.

A still further object of the invention is to provide a material gathering and hoisting means so constructed that a comparatively heavy load may be elevated an appreciable distance above the ground.

Another object of the invention is to provide means for readily dumping a load while elevated which is so constructed that the load carrying portion of the mechanism automatically returns to normal latched condition after said dumping.

Other and further objects and advantages of the invention will be readily understood from the following detailed description thereof.

In the drawings:

Figure 1 is a side elevation of the new machine, certain portions thereof showing in longitudinal vertical section, the view being taken substantially on line 1—1 of Figure 2, and showing the rear axle housing of the tractor of the invention partially broken away and other portions of said tractor in dotted lines, a sweep-head employed in a full line elevated position and in a dotted line lowered position; also showing, by dotted lines, the load dumping position of said sweep-head when elevated.

Figure 2 is a top plan view of the new device.

Figure 3 is a front elevation of certain portions thereof.

Figure 4 is a fragmentary perspective view of a portion of a sweep-head latch employed.

Figure 5 is a top plan view of certain actuating mechanism employed at the rear end portion of the new device.

Figure 6 is a side elevation of a brake mechanism employed, the view being taken on line 6—6 of Figure 5.

Figure 7 is a side elevation of a lock mechanism employed for holding the sweep-head in a selected elevated position, the view being taken on line 7—7 of Figure 5.

The combination of the present invention includes primarily a tractor generally indicated at T, a sweep-head generally indicated at 44, means for raising and lowering said sweep-head, means which includes caster wheels for supporting the sweep-head from the ground independently of the wheels of the tractor and actuating means for the combination.

Referring now to the drawings for a more particular description, the tractor T is preferably of "Farmall" type. For convenience of illustration, the tractor is represented in the drawings primarily by means of dotted lines. The tractor includes a body frame 10; rear axle housing 11; rear traction wheels 12; one or more front steering wheels 13 which are controlled by the hand steering wheel of the tractor in a well known manner.

At the rear side of the rear axle housing 11 the tractor is provided with a power take-off shaft S which is in communication, at times, with the crank shaft of the engine by its conventional transmission gearing, and it will be understood that by means of a clutch and clutch lever, not shown, the operator may cause revoluble movements to be imparted to the shaft S at times when the engine of the tractor is operating.

The new mechanism which is combined with the tractor T includes guide rails 14 and 15 which are respectively disposed at opposite sides of the main body portion of the tractor, extending under and beyond the rear axle thereof and forwardly beyond the front end of the tractor. The rails 14 and 15 may be secured to the rear axle housing 11 of the tractor T by any suitable means which permits slight pivotal swinging movements of the rails in a vertical direction.

As best shown in Figure 5, the attaching means includes two oppositely disposed bars 200 having rear ends which may be welded to a later described rear platform 99. If desired, each bar may be made adjustable in length and formed of two overlapping half portions which are joined together by means of bolts, whereby the new device may be readily attached and fitted to tractors of different lengths.

The attaching bars 200 extend from the rear platform 99 forwardly, one to each side of the differential gear housing 203 of the rear axle housing 11 of the tractor, each of said bars being provided with two apertures 204 disposed through its forward enlarged end. A stud bolt 205 extends through each of said apertures of said bars and into the housing 203. The stud bolts have threads on the ends thereof which engage the threads provided in said housing during initial manufacture of the tractor.

The attaching bars 200 are provided at their rear ends with bushings 206 for supporting a transversely disposed shaft 201, on which the rear ends of the guide rails 14 and 15 are pivotally mounted. Also said bushings provide a support for a later described guard shield 127.

The stud bolts 205 which secure the attaching bars to the rear axle housing cause the guide rails 14 and 15 and the attaching bars 200 to be maintained substantially in parallelism with respect to the longitudinal length of the tractor T.

The forward ends of the guide rails 14 and 15 are connected together by means of a transversely disposed brace bar 16, and the ends of the latter, as shown in Figures 2 and 3, extend beyond the sides of said rails. At each end of the brace bar 16 a caster wheel 17 is disposed. The stub axles 18 of the wheels 17 are integral with arms 19 and the latter are pivotally connected as at 20 to the ends of the brace bar 16.

As the machine travels forwardly, the caster wheels 17 of the new mechanism bear upon the surface of the ground independently of the forward steering wheel or wheels 13 of the tractor T and the rails 14 and 15 are thus permitted to have slight swinging movements in a vertical direction, whereby a compensation is provided for unevenness in the contour of the surface of a hayfield for adequately supporting a later described sweep-head portion of the mechanism, said sweep-head being carried at the forward ends of the guide rails 14 and 15 and the weight of the sweep-head being supported by the caster wheels 17.

At times when the operator of the vehicle actuates the hand steering wheel of the tractor T for causing the front wheel 13 of the latter to turn, a corresponding motion is applied to the caster wheels 17 of the new device, whereby accurate steering of the whole combination is permitted for following crooked windrows of hay.

A push arm 21 is normally disposed, when in a down position, in parallelism with respect to and above the guide rail 14, and a similar push arm 22 is similarly disposed above the guide rail 15. Anti-friction rollers 23 and 24 are provided respectively adjacent the rear or lower ends of the push arms. The rollers 23 and 24 bear upon the upper surfaces of the guide rails during forward and upward movements of the forward ends of the push arms, as later described. The rollers 23 and 24 are mounted on pivot pins 25 between their oppositely disposed extension ears 26 which bifurcate ends of the push arms. The ears are secured, by any suitable means, such as welding or the like, to the rear ends of the push arms and are provided with angularly disposed portions 27 which project below the guide rails for supporting later described grooved idler pulleys for raising cables employed. The rear ends of the push arms pass underneath the rear axle housing 11 of the tractor T during a raising and lowering of said push arms, for purposes later described.

Adjacent the forward ends of the guide rails 14 and 15, upwardly disposed standards 28 and 29 are suitably welded thereto for supporting later described lifting arms. As best shown in Figure 3, the upper ends of the standards may be connected together by means of angularly disposed crossed sway prevention bars 31 and 32 if desired. The standards 28 and 29 are held rigid in directions parallel with respect to the guide rails by means of inclined braces 33, as shown in Figure 1, and ends of each of the braces are secured by welding to their respective guide rail and standard. The standards are disposed between the push arms 21 and 22 in a manner whereby upward and forward movement of the push arms is permitted.

As best shown in Figure 3, the upper ends of the standards support a rod 34 which extends through the standards for supporting thereon anti-friction rollers 35 and 36 upon which lifting arms employed are arranged to slide.

Two oppositely disposed lifting arms 38 and 39 are employed, the upper ends thereof being bent or curved forwardly and having lower ends secured by pivot pins 40 to their respective push arms. The pivot pins 40 are disposed through the lower ends of the lifting arms and through the push arms. The underneath sides of the lifting arms engage the anti-friction rollers 35 and 36, between the channels of said rollers, for guiding purposes during a raising of the sweep-head and during a forward and upward travel of the lifting arms, as later described.

The forward ends of the push arms are each provided with a cross head portion 41. A brace member 42 extends from each push arm to a lower end of a cross head and said members 42 are each provided with an angularly disposed forwardly extending portion 43 for providing a cradle for the sweep-head.

A sweep-head, generally indicated at 44, is pivotally mounted at the outer ends of said portions 43, the latter in conjunction with said cross heads providing said cradle for a reception therein, at times, of the tiltable sweep-head, the members 42 providing rigidity to the cross heads.

The sweep-head includes a plurality of tines 45 which are equidistantly spaced apart in longitudinal parallelism. A connecting member 46 is bolted to the under side of the tines at a distance approximately one-third of the length of and towards the rear ends of the tines.

Oppositely disposed pairs of ears 51 are rigidly secured to the connecting member 46 of the sweep-head. The ears project toward the cradle, as shown in Figure 1, and between each pair outer ends of the angularly disposed portions 43 of the cradle are secured by means of pivot pins 47. The latter extend through the ears and the portions 43 of the cradle for providing a pivotal connection of the sweep-head with the cradle.

At the time a load of material is disposed on the tines of the sweep-head and at times when later described detent hooks are released, the outer and major portion of the load causes the sweep-head to tilt and the load to slide off the tines, since the major portion of the weight of said load is disposed outwardly of the pivots 47.

The sweep-head further includes spaced apart back stop bars 48 and end bars 53 which are disposed at a right angle with respect to the tines, being secured to the rear ends, certain of the tines preferably by bolts which are disposed through the tines, bars 48 and a transversely disposed connecting sill member 49 and reinforcing plate 52, the latter showing only in Figure 3.

As shown in Figures 1 and 3, two oppositely disposed sideboards or short tines 50 are provided having their wider ends secured to the end bars 53 for preventing hay from unduly spilling over the sides of the sweep-head during operation, said sideboards 50 being tapered forwardly for spearing or penetrating readily into a heap of mown hay during a loading of the sweep head. The upper ends of the bars 48 of the back stop of the sweep-head 44 are rigidly connected together by means of a transversely disposed bar 54 and bolts therethrough.

As shown in Figure 4, L-shaped spaced apart supports 55 are secured to the upper surface of the transverse connecting bar 54 of the back stop. A rotatable latch rod 56 is journalled through the supports 55. A trip lever 57 is rigidly secured to the rod 56, and a spring 58 having its ends respectively secured to the lever and bar 54 of the sweep-head is employed for urging the trip lever to its normal position towards the sweep-head. At the free end of the lever 57 a ring 59 is secured. A flexible rope 60 is attached to the ring, said rope extending to any convenient place adjacent the operator while he is seated on the tractor and, as shown in Figure 2, the lower end of said rope may be attached to the steering mast of the tractor whereby the operator may pull said rope for actuating the trip lever, for purposes later described.

Two oppositely disposed like latch bars 61 and 63 are provided for securing the sweep-head to its cradle automatically at times when the rear end of the sweep-head tilts downwardly after dumping a load of hay from its tines. The latch bars are each longitudinally slidable through their respective two like guide supports. As best shown in Figure 4, the guide supports for the latch bar 61 includes an arm 62 which is welded or otherwise suitably secured to the push arm 21. The other guide support for the latch bar 61 is provided by means of an elongated rectangular aperture 62' formed through the upper end of the cross head 41 of the push arm 21. The guide support 62 is provided with a similar aperture 63', the upper end of which is approximately the distance from the push arm 21 as the lower end of the aperture 62' of the cross head 41, whereby the latch bar 61 is not only slidably disposed through said apertures but is also permitted to have swinging movement longitudinally as limited by the ends of said apertures.

Springs 64 are employed for urging the latch bars towards the sweep-head, said springs having ends secured to the guide support arms 62 and opposite ends secured to the latch bars. The springs not only urge the latch bars toward the sweep-head but also urge the rear ends of the latch bars upwardly and the hook ends thereof downwardly, while permitting an upward movement of said hook ends against the urge of the springs, as shown in Figure 4, for purposes later described.

The urge of the springs 64 is limited by means of detent cables 65 having ends secured to the latch bars, as shown in Figure 1, and the cables extend over pulley wheels 66, the latter being secured respectively to the push arms 21 and 22. From the pulleys 66, the other ends of the cables 65 are secured to suitable pins or the like 67, said pins being respectively fastened to the lifting arms 38 and 39. The pulleys 66 are pivotally attached to plates 67', the latter being secured respectively to the push arms 21 and 22 as shown in Figures 1 and 2. The lifting arms 38 and 39 may each, if desired, be provided with a plurality of the pins 67 for adjusting the length of the detent cables 65.

Those ends of the latch bars which are oppositely disposed with respect to the springs 64 are each provided with a hook 68 and elongated portions 69 which are inclined with respect to the length of the latch bars, so that the lower rear end of the sweep-head will first strike the inclined portions 69 of the latch hooks 68 during a return of the sweep-head 44 to its cradle and push the latch bars toward the tractor against the urge of the springs 64.

At the time said lower edge of the sweep-head, by the weight and return movement thereof, has moved past the portions 69 of the latch hooks, together with the back stop bars of the sweep-head, the springs 64 urge the hook ends of the latch bars against the latch rod 56 until the latter is below the hooks 68, whereupon said springs move the hooks over the rod 56. At this time the rear end of the empty sweep-head moves upwardly, causing the hooks to engage the rod 56.

The rod 56 is provided with a lug or extended portion 70 at each of its ends, which are below the hooks 68, as shown in Figure 4, when the sweep-head is latched. At times when the trip lever 57 is actuated by the rope 60 for rotating the rod 56 substantially one-fourth turn, said motion causes the lugs 70 to be turned correspondingly and engage the hooks for forcing the latter to become released from the rod 56 at times when the sweep-head is loaded with hay for permitting the sweep-head to tilt and dump said load, whereupon the sweep-head returns to a normal latched position with respect to the cradle.

Lower ends of lifting cables 71 are attached, by any suitable means, to the lower end portions of the standards 28 and 29 as shown in Figures 1 and 3. The lifting cables extend over grooved pulleys 73, the latter being pivotally secured respectively to the upper ends of the lifting arms 38 and 39, being mounted on plates 74 which are attached to said arms at the inner sides of the latter. From the pulleys 73 the lifting cables extend to the guide support arms 62, being attached to said arms as shown in Figure 2.

The upper side of the platform 99 is in approximate parallelism with respect to the power take-off shaft S of the tractor T for lessening friction on a universal joint employed. The platform 99 may be formed of a single piece welded or otherwise suitably secured to the attaching bars 200.

A transversely disposed jack shaft 103 is journalled through end pillow blocks 104 and a medially disposed block 105, said blocks being secured to the upper side of the platform 99. Two spools or winding drums 106 are employed keyed to the jack shaft 103 axially of said shaft, as shown in Figure 5.

The driving mechanism further includes a universal joint 107 connected to the power take-off shaft S of the tractor T. The ring of the universal joint is connected, by means of a pin 100, to a shaft 109, the latter having a round end portion and a square end portion. Slidably disposed upon the square end portion of the shaft 109, a half portion 110 of a clutch member is provided having an annular channel at its end opposite its toothed end. A bifurcated yoke 111 is disposed in said channel, whereby at times when the operator manipulates a lever 112 which is attached to said yoke the clutch portion 110 slides upon said squared end portion during rotary movements of the shaft 109. The lower end of the lever is pivotally connected as at 113 to the adjacent attaching bar 200. The other toothed half portion 114 of the clutch is formed integral with a small bevel pinion 108 and the latter, together with said clutch portion 114, is idly mounted on the round end portion of the shaft 109. The round end portion of the shaft is journalled into the side wall of the pillow block 105, as indicated by dotted lines in Figure 5. An annular detent bushing 115 may be provided on the shaft 109 for preventing a too close meshing of the teeth of the pinion 108 with a large pinion 116, the latter being splined to the jack shaft 103 and by this means, at desired times, when the engine is operating the motion and power thereof is applied to the jack shaft 103 for rotating the winding spools 106 correspondingly.

A brake drum 115' is splined to the jack shaft 103. A strap 116' is disposed around the perimeter of the brake drum. The ends of the strap are bent outwardly and each is provided with an aperture. As shown in Figure 6, a portion of the strap is welded as at 101 stationary to the platform. A bolt 118' is disposed through said apertures of the strap ends for preventing said ends from spreading too far apart, and a coiled spring 118 is disposed about the bolt between said outwardly bent ends of the strap 116 for normally urging said ends away from one another, whereby the diameter of the strap, when urged, is greater than the diameter of the brake drum for permitting free turning movements of the latter. A lever 117 which is pivotally connected to the adjacent attaching bar at its lower end is provided with an outstanding arm 116'' arranged to engage the free end of the strap 116, whereby upon a movement of the lever in one direction the strap 116 becomes contracted against the drum and against the urge of the spring 118 for preventing an overrunning movement of the spools 106.

A third lever 117' having a lower end pivotally attached as at 102 to the platform 99, as shown in Figures 5 and 7, is provided with a detent dog 120, and may be moved transversely for moving the detent into and out of engagement with a selected tooth of a ratchet wheel 119 for locking the sweep-head in a selected elevated position, since said ratchet wheel is integral with its adjacent winding drum.

From the winding drums 106 push arm cables 121 extend over idler pulleys 122 which are revolubly disposed on their shaft 123, the latter being disposed between the standards 28 and 29. From the pulleys 122 the cables 121 extend over idler pulleys 124, the latter being pivotally mounted at the inner sides of the angular portions 27 of the extension ears 26 on the rear ends of the push arms 21 and 22 below the guide rails 14 and 15, respectively. Yokes 30 are welded to said angular portions 27 and pivot pins 125 are provided for the pulleys 124. From the pulleys 124 the cables 121 extend forwardly, being rigidly secured to the lower ends of the standards 28 and 29.

At times when the two half portions of the clutch are engaged, the motion and power from the engine shaft S is transferred to the then driven jack shaft 103, and the winding drums or spools are provided with a corresponding motion for reeling the cables 121 around said drums 106, whereby the length of the cables 121 becomes shortened correspondingly. As best shown in Figure 1, at times when the cables 121 become shortened, the lower rear ends of the push arms 21 and 22 are thereby caused to move forwardly upon their tracks or guide rails 14 and 15, and a corresponding movement, imparted in an upward direction, is applied to the sweep-head 44 for moving the latter from the dotted line position thereof, as shown in the lower portion of Figure 1, to its full line and elevated position, as shown in said figure, while the sweep-head is secured to its cradle by means of the latch bar 61 and hooks 68.

As the forward ends of the push arms become forced forwardly by the cables over the rear ends thereof, a forward and upward motion is correspondingly applied to the lifting arms for causing the latter to move from a normal angle of approximately 45 degrees towards a vertical position, as shown by the full line position of the lifting arms in Figure 1. The forward and upward movement of the lifting arms causes the pulleys 73 at the outer upper ends thereof to traverse the lifting cables 71 and the latter to become taut, whereby the distance between the pulleys 73 and the guide support arms 62 becomes correspondingly lessened, thereby swinging the sweep-head upwardly, said upward movement of the sweep-head corresponding in elevation to the shortened distance between the pulleys 73 and the members 62.

At the start of the upward movement of the sweep-head, the lifting arms 38 and 39 slide upon their respective anti-friction rollers 35 and 36. The motion and power from the engine of the tractor being applied, as above described, the sweep-head is caused to be lifted, together with a load of material carried thereby.

A guard plate 127 is preferably disposed over the mechanism at the rear of the platform 99, as shown in Figure 2, said plate showing in section in Figures 5 and 7, for preventing injury to the operator's feet should he move from the seat of the tractor.

It is well known that during a harvesting of hay, the conventional manner is to cause a mowing machine to traverse a hayfield for severing the blades of grass near the surface of the ground. After the new mown hay has been permitted to dehydrate to a desired extent, a hayrake is then applied for gathering the hay into spaced apart windrows, in a well known manner. The windrows are normally fairly straight. However, resultant from irregular contour of the surface of the hayfield, and also resultant from careless timing in manipulating the hayrake, said windrows are often arcuate in plan, and the combination of the instant invention is so arranged that it is adapted to harvest hay from crooked windrows with equal facility with respect to straight windrows.

In operation, the sweep-head 44 is lowered to the position shown by the dotted lines in Figure 1 and the machine caused to travel forwardly by the power of its engine. At this time the outer ends of the tines 45 are closely adjacent the surface of the ground, whereby during forward travel the hay becomes swept or gathered into the sweep-head. When filled, the sweep-head is caused to be elevated, whereupon the machine transports the load of hay to a selected position where a haystack is being formed, and upon arrival of the machine into a selected position with respect to the haystack the operator actuates the rope 60 for causing the hooks to release the sweep-head, whereupon the latter tilts from the full line elevated position thereof as shown in Figure 1 to its elevated dotted line position, and since the weight of hay at the outer ends of the tines overbalances the weight of the hay adjacent the back stop portion of the sweep-head, the hay slides off the tines and downwardly upon the haystack. The machine then travels back to a windrow, and during said travel the sweep-head is caused to become lowered, the push arms sliding rearwardly on their guide rails 14 and 15 at the sides of the machine until the rollers at the lower rear ends of the push arms strike the detent lugs 126 at the rearward ends of the guide rails 14 and 15. Said operation is then repeated until a haystack is formed.

It will be understood that for convenience of illustration, the push arms and lifting arms are shown appreciably shorter than in actual practice, and in actual practice said push arms are approximately twice as long, proportionally, as shown in Figure 1, whereby the new mechanism is adapted to build comparatively high stacks of hay.

As soon as the weight of the load of hay is released from the sweep-head, as above described, the weight of the back stop portion of the sweep-head overcomes the weight of the free ends of the tines, whereupon said portion moves downward towards its cradle and becomes locked for further operation as above described.

Among other advantages of the invention it is believed pertinent to mention that, since the construction provides an arrangement of parts such that the push arms extend under and beyond the rear axle of the tractor, comparatively long push arms may be employed for providing high haystacks and without unduly increasing the entire length of the invention at times when the push arms are in a down position, whereby a steerable and not unwieldy device is provided.

With respect to the latching means for the sweep-head, the springs 64 thereof are shown by dotted lines in Figure 2, having ends respectively connecting the ends of the latchbars 61 to extensions of the arms 62, whereby the springs 64 not only urge the latch bars toward the sweep-head but also urge the rear ends of the latch bars upwardly and against the walls of the upper ends of the slots 63' of the arms 62, so that said walls provide fulcrums or pivotal points for swinging movements of the bars 61 as well as sliding movements under urge of the springs 64, since the springs lift the rear ends of the latch bars upwardly and urge the hook ends of said bars downwardly, said downward urge being permitted resultant from the elongation of the slots 62'. At times when the latch bars 61 are in the position shown in Figure 4 and the hooks 68 engaged with the rod 56, the latch bars 61 are below the upper walls of the slots 62' of the cross heads 41, and at this time the springs 64 urge downwardly upon the sweep-head at times when the latter is loaded, since the sweep-head, when loaded, is nearly counter-balanced on its pivots 47 and the springs are of sufficient strength to cause the bars 61 to be spaced away from the upper ends of the slots 62', whereby at the time the rod 56 is rotated for turning the lugs 70 the latter lift the hooks 68 upwardly for freeing the hooks from said rod, said upward movement of the hooks and adjacent portions of the bars 61 being permitted against the urge of the springs 64 since the slots 62' are sufficiently elongated for said purpose. An advantage of the particular latching means is that it provides a compensation for bending of the sweep-head structure, considered as a whole, as happens during and resultant from a gathering of hay from the surface of a hayfield, since the forward ends of the tines may strike stones or similar obstructions and the sweep-head become lopsided, said compensation being such that ordinarily operation may continue without repairs.

Also an advantage of the particular construction of the latching means is that at times when the sweep-head is down to the loading or hay-sweeping position shown by dotted lines at the lower portion of Figure 1, the forward ends of the tines 45 may ride upon the surface of a hayfield and reciprocate slightly in a vertical direction in accordance with the undulations of said surface during forward travel of the machine, said reciprocation being permitted by the latch mechanism since the springs 64 urge the hooks 68 forwardly of the latch bar 56 at said time, whereby said forward ends of the tines gather wisps of hay which are close to said surface and the latter is swept clean of hay without loss of any of the hay.

As an aid to holding the guide rails 14 and 15 in parallelism with the length of the machine particularly at times when turning the machine about at the end of a windrow, two chains may be employed if desired. The chains are indicated by the dotted lines 220 and 221 in Figures 2 and 3. The outer ends of the chains 220 and 221 are secured to the guide rails 14 and 15 respectively, and the inner ends thereof are secured to the central bracket 222, indicated in Figure 3 only. The bracket 222 supports the radiator of the tractor and the inner ends of the chains may, if desired, be secured to any other suitable portion of the forward end of the tractor. The chains are flexible and loose enough to permit the above described swinging movements in a vertical direction of the forward ends of the rails 14 and 15, together with their adjunct parts carried by said rails at their forward ends, and come into play at times when the steering wheel of the tractor is turned sufficiently to the right or left.

From the foregoing description it is thought to be obvious that a machine for gathering, transporting and stacking materials constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

I claim:

1. In a material gathering and elevating device, a tractor, two guide rails disposed under the rear axle housing of the tractor between the rear wheels thereof, ends of said rails having a pivotal connection with said houesing rearwardly of the latter, caster wheels for supporting the other ends of said rails independently of the tractor, standards secured to said rails, push arms having ends arranged to slide on said rails, a sweep-head pivotally secured to the other ends of said push arms, means for latching the sweep-head to said push arms, lifting arms having ends pivotally attached to the push arms and arranged to slide on the upper ends of said standards, the other ends of said lifting arms being provided with pulleys, lifting cables having ends secured to said standards, said cables being disposed over said pulleys and having their other ends secured to said other ends of the push arms, and means for unlatching said sweep-head.

2. In a material gathering and elevating device, a tractor, guide rails having ends pivotally connected to the rear end of said tractor, caster wheels for supporting the other end of said rails independently of the tractor, standards upstanding from the forward end of said rails, anti-friction rollers carried by the upper end of said standards, push arms having ends arranged to slide on said rails, a sweep-head pivotally secured to the other ends of said push arms, means for latching the sweep head to the other ends of the push arms, means for raising and lowering the sweep-head, and means for actuating said latch to release the latter.

3. The construction of claim 2 in which said push arms extend below said rails and carry pulleys for effecting the lowering and raising said sweep-head.

4. The construction of claim 2 in which said push arms extend below said rails and carry pulleys, cables secured to the lower end of said standards and passing over the pulleys to effect lowering and raising said sweep-head.

BENJAMIN F. OWEN.